(12) United States Patent
Santos et al.

(10) Patent No.: US 8,455,831 B2
(45) Date of Patent: Jun. 4, 2013

(54) SENSING ASSEMBLY HAVING AN OBLIQUE VIEWING ANGLE RANGE AND METHODS OF ASSEMBLING, MOUNTING AND ORIENTING THE SAME

(75) Inventors: Roberto S. Santos, Hudson, MA (US); Diana A. Sufariu, Nashua, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 58 days.

(21) Appl. No.: 13/315,949

(22) Filed: Dec. 9, 2011

(65) Prior Publication Data

US 2012/0168629 A1  Jul. 5, 2012

Related U.S. Application Data

(60) Provisional application No. 61/428,909, filed on Dec. 31, 2010.

(51) Int. Cl.
    *G01J 5/02* (2006.01)
(52) U.S. Cl.
    USPC ........................................................ 250/353
(58) Field of Classification Search
    USPC ..... 250/353, 338.1–338.5, 340, 341.1–341.8, 250/342–352
    See application file for complete search history.

(56) References Cited

U.S. PATENT DOCUMENTS

| | | | |
|---|---|---|---|
| 4,468,814 A | | 8/1984 | Field |
| 5,083,025 A | * | 1/1992 | Blomberg ...................... 250/353 |
| 5,103,346 A | * | 4/1992 | Chang ........................... 359/855 |
| D391,182 S | | 2/1998 | Schneider et al. |
| 7,667,614 B2 | | 2/2010 | Helm et al. |
| 2011/0101967 A1 | | 5/2011 | Kayserman et al. |

FOREIGN PATENT DOCUMENTS

| | | |
|---|---|---|
| DE | 3918874 A1 | 12/1990 |
| DE | 19512915 C1 | 8/1996 |
| FR | 2643640 A1 | 8/1990 |
| WO | 2004047246 A1 | 6/2004 |

OTHER PUBLICATIONS

Efector 100—Alignment of the Sensing Face; IFM Electronic catalog page; Feb. 2007.
Efector 100 Inductive Sensors—IMC3040-BPKG/K1/US; IFM Electronic catalog page; Jun. 7, 2007.

(Continued)

*Primary Examiner* — Kiho Kim
(74) *Attorney, Agent, or Firm* — William R. Walbrun; Whyte Hirschboeck Dudek S.C.; John M. Miller (57) ABSTRACT

Disclosed herein is a sensing assembly. The assembly includes a sensing assembly housing for enclosing an interior. The assembly further includes a plurality of sensing assembly components which are at least partially positioned, or at least partially contained, within the interior. And the assembly includes an indicator lens device which is integral with, or integrated with respect to the housing. In at least some embodiments, at least a portion of the housing coincides at least in part with a first axis and at least a portion of the indicator lens coincides with a second axis, such that the first axis and the second axis intersect to form an oblique viewing angle range and at least a portion of the indicator lens device is visible at least substantially throughout the oblique (e.g., obtuse) viewing angle range.

20 Claims, 4 Drawing Sheets

OTHER PUBLICATIONS

BES Q40KFU-PSC20A-S04G Inductive Sensors; Balluff Sensors Worldwide catalog page; www.balluff.com; Feb. 15, 2008.
Inductive Proximity Switch—Part No. IQ350NK70TA3; Wenglor catalog page; admitted to be prior art at least as early as Nov. 21, 2010.
Uprox + Inductive Sensor; Turck Industrial Automation catalog page; www.turck.com; Aug. 11, 2009.
Bulletin 871P VersaCube Inductive Proximity Sensors; Allen-Bradley; www.ab.com/catalogs; Mar. 2009.
Model No. NBN40-L2M-E2-V1 Inductive Sensor; Pepperl+Fuchs catalog page; www.pepperl-fuchs.com; Jun. 17, 2010.
Model No. NBN40-L3M-A2-C3-V1 Inductive Sensor; Pepperl+Fuchs catalog page; www.pepperl-fuchs.com; Oct. 26, 2010.
Bulletin 871F Flat Pack Inductive Proximity Sensors catalog pages; Allen-Bradley; www.ab.com/catalogs; Mar. 2009.

* cited by examiner

SENSING ASSEMBLY HAVING AN OBLIQUE VIEWING ANGLE RANGE AND METHODS OF ASSEMBLING, MOUNTING AND ORIENTING THE SAME

CROSS-REFERENCE TO RELATED APPLICATIONS

This application claims the benefit of U.S. provisional patent application No. 61/428,909, which was filed on Dec. 31, 2010 and entitled "Sensing Assembly Having an Oblique Viewing Angle Range and Methods of Assembling, Mounting and Orienting the Same", and which is hereby incorporated by reference herein.

STATEMENT REGARDING FEDERALLY SPONSORED RESEARCH OR DEVELOPMENT

Field of the Invention

The present invention relates to sensing devices and, more particularly, relates to various sensing assemblies and assembly components, and/or methods for assembling and/or orientating the same.

BACKGROUND OF THE INVENTION

Sensing devices of many different types are commonly employed in a variety of environments and applications. Sensing devices encompass a broad spectrum of devices including, for example, various light-sensing devices such as laser-sensing devices, light sensing devices that are capable of distinguishing among different colors of visible light, and devices for sensing various other types of radiation including infrared radiation or heat, microwave radiation, and x-ray radiation. Additionally, other sensing devices include, for example, devices that are capable of sensing the position of other structures, acoustic sensors, vibration sensors, motion sensors such as accelerometers, orientation sensors involving gyroscopes, and numerous other types of sensing devices.

Sensing devices are employed in a wide variety of industrial, commercial, military, residential and other environments and applications. For example, in industrial environments, light sensors are often employed in conjunction with conveyor systems such as those used in assembly lines. Such light sensors are often used to detect the presence of objects moving down an assembly line and to determine whether a given object has entered or exited a particular region of the assembly line. Light sensors of similar design can also be used in residential applications, for example, in connection with garage door openers. Also for example, in many commercial facilities as well as residential homes, various sensing devices are used in security systems in order to detect the presence of potential intruders within or nearby those facilities or homes. Sensing devices can further be implemented on vehicles, for example, to detect the presence of objects behind vehicles. Indeed, sensing devices are ubiquitous in today's modern world.

Although in some cases sensing devices are free-standing, typically sensing devices are mounted upon or in relation to other supporting structures. Further, in many if not most circumstances, it is desirable that the sensing devices be mounted in relation to such supporting structures in a fixed manner, or at least in a manner by which the location and orientation of a given sensing device relative to the supporting structure(s) and/or a signal source is known or predictable. For example, in the case of a light sensing device implemented in a manufacturing assembly line, it is typically desired that the light sensing device be fixedly orientated in a particular direction so as to be aligned to receive a light beam from a light source located elsewhere. The mounting of light sensing devices in other environments, such as in the case of garage door openers, similarly can entail the careful, fixed positioning of the sensing devices.

Although it is often desirable to be able to fixedly and reliably orient a sensing device in a desired direction or otherwise, it is also desirable that a sensing assembly be suitable for use in a variety of locations and environments. For this reason, some known sensing assemblies include multiple components that can be repositioned relative to one another so as to allow the orientation of the sensor face (e.g., the face of the sensor at which light is incident on the sensor) to be varied in its position relative to another supporting portion of the sensing assembly by which the sensing assembly is mounted to another supporting structure such as a wall. Although such sensing assemblies can often provide desired flexibility in terms of positioning of the sensor face, some such sensing assemblies are disadvantageous in that the reorientation of the different sensing assembly components requires time-consuming efforts such as screwing and unscrewing bolts used to secure the various components to one another.

Additionally, it is often the case that one or more indicator lights are provided on sensing assemblies to provide indications to users of the status of the sensing assemblies. Although such indicator light(s) can provide useful information to users, they can only do so if they are visible to the users.

Therefore, it would be advantageous if improved sensing devices, sensing assemblies and/or assembly components, and/or methods for assembling, mounting, and/or orientating same, can be developed so as to address one or more of the above issues and/or one or more other goals.

BRIEF SUMMARY OF THE INVENTION

In at least some embodiments, the present invention relates to a sensing assembly. The assembly includes a sensing assembly housing for enclosing an interior. The assembly further includes a plurality of sensing assembly components which are at least partially positioned, or at least partially contained, within the interior. And the assembly includes an indicator lens device which is integral with, or integrated with respect to the housing. In at least some embodiments, at least a portion of the housing coincides at least in part with a first axis and at least a portion of the indicator lens device coincides with a second axis, such that the first axis and the second axis intersect to form an oblique viewing angle range and at least a portion of the indicator lens device is visible at least substantially throughout the oblique (e.g., obtuse) viewing angle range.

Additionally, in at least some embodiments, the present invention relates to methods for assembling a sensing assembly. And in at least some other embodiments, the present invention relates to methods for assembling a sensing assembly housing.

Other aspects, embodiments, objects and features of the invention are contemplated and will become apparent to those skilled in the art from the following detailed description with reference to the accompanying drawings

DETAILED DESCRIPTION OF THE PREFERRED EMBODIMENT

The drawings showing embodiments of the assemblies and/or methods are not necessarily to scale. Similarly, the views in the drawings are provided for ease of understanding, however it should be understood that the orientation shown are typically arbitrary. The assemblies can generally be assembled or positioned for use in virtually any, orientation. Terms suggesting orientation, such as "front", "rear", "beyond", "beside", "bottom", "top", "side" and the like are typically defined or described with respect to the orientation of the sensing assembly and sensing assembly housings as they are illustrated or used. This is intended to facilitate a full understanding of at least some embodiments of the present invention. However, these and similar terms should be interpreted in a broad and non-limiting sense.

Figures 1, 2:
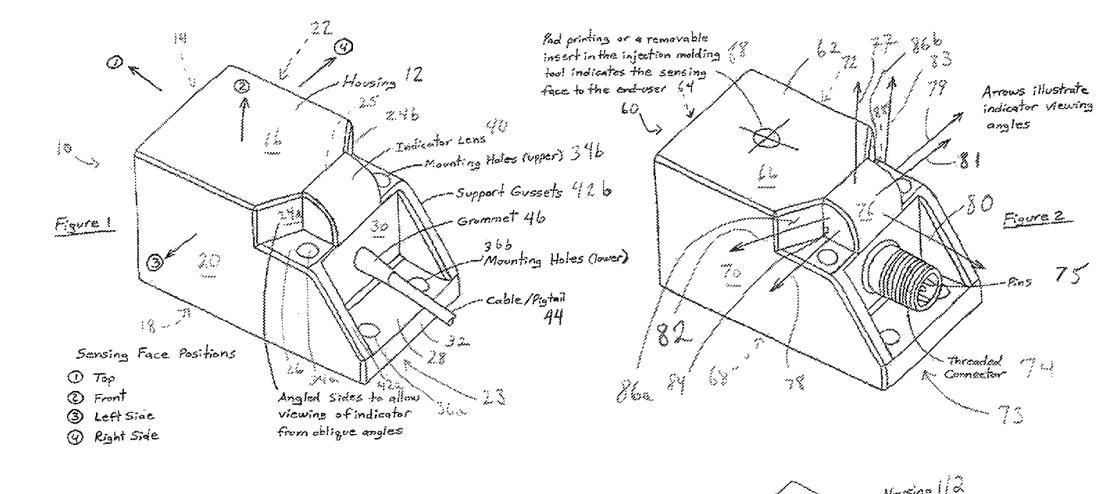
FIG. 1 is a perspective view of a sensing assembly in accordance with at least one exemplary embodiment of the present disclosure.
FIG. 2 is a perspective view of a sensing assembly in accordance with at least one other exemplary embodiment of the present disclosure.

Referring to FIG. 1, a sensing assembly 10 is shown. The sensing assembly 10, as well as other sensing assemblies (and sensing assembly components) discussed below should be understood as representative of any of a variety of types of sensing assemblies (and components) that can be used in a variety of applications. For example, in some embodiments, the sensing assemblies can be light sensing devices that can be implemented in conveyor systems as are often found in manufacturing and other commercial facilities implemented in assembly lines or the like. Also, in other embodiments, the sensing assemblies can include or encompass a variety of other types of assemblies, components or devices including, for example, other light-sensing devices (e.g., color-sensing devices, etc.), devices for sensing various other types of radiation (e.g., infrared, microwave, x-ray, etc.), position-sensing devices, acoustic sensors, vibration sensors, motion sensors such as accelerometers, orientation sensors involving gyroscopes, and numerous other types of sensing devices. Further, the sensing assemblies can be suited for any of a variety of industrial, commercial, military, residential and other environments and/or be employed in connection with a variety of different applications.

In accordance with at least some embodiments and as shown in FIG. 1, sensing assembly 10 can take the form of a proximity sensor. The sensing assembly 10 includes a housing 12 that provides an enclosure for, by way of example, sensing assembly components, which are described further with reference to FIG. 3. The housing 12, as shown, includes a top 14 (arrow shown in phantom since it is hidden in the present view), a front 16, a rear 18 (hidden), a left side 20 and a right side 22 (hidden). The housing 12 further includes a number of other portions which make up a bottom, generally referred to the numeral 23, which collectively complete the enclosure, and these other portions generally include sides or faces 24a-b, a connection portion 25 (hidden), first (or upper) mounting portion 26, second (or lower) mounting portion 28, first (or upper) side portion 30, and second (or lower) side portion 32. As shown, the upper side portion 30 generally extends between and from the upper and lower mounting portions 26 and 28, respectively, and the lower side portion 32 generally extends between and from the lower mounting portion 28 and the rear 18 (hidden).

The housing 12 generally comprises a sensing face which can be configured to correspond with at least one of the top 14, front 16, left side 20, or right side 22. Stated another way, the housing can include a sensing face that is configured to be viewed from one of four positions, including, as shown, from positions indicated by arrow 1, 2, 3 and 4, respectively. The sensing face provides for a surface at which, or by way of which, a sensible signal is, or can be, detected.

In accordance with at least some embodiments, the housing 12 is typically molded or otherwise made of a plastic material, while in at least some other embodiments, the housing, or a portion of the housing, can be made out of metal. In accordance with various embodiments, the sensing face (again corresponding to one of the top, bottom, left side and ride side) is either also made of metal, or out of a plastic material.

As shown and in accordance with at least some embodiments, the housing 12 further includes a first (or upper) pair of mounting holes 34a-b that are provided and/or positioned with respect to the first (or upper) mounting portion 26, and a second (or lower) pair of mounting holes 36a-b, or other mounting structures, that are provided and/or positioned with respect to, the second (or lower) mounting portion 28. Each pair of mounting holes 34a-b, 36a-b is spaced apart so as to be provided in accordance with a pattern that is consistent with and generally accepted by the industry. For example, in accordance with at least some embodiments, the center-to-center distance between mounting holes 34a-b is 30 mm and the center-to-center distance between mounting holes 36a-b is 20 mm. The mounting holes 34a-b and 36a-b permit mounting of the sensing assembly 10 in a known manner. For example, the sensing assembly 10 can be mounted to another structure using screws, other connecting devices, or similar hardware (not shown), secured via the mounting hole pairs 34a-b, and 36a-b. In accordance with various embodiments of the invention, the mounting holes 34a-b, 36a-b are generally integrally formed in, or otherwise integrated with respect to, the housing 12, and more particularly the upper and lower mounting portions 26, 28, respectively, thereby reducing, or possibly altogether avoiding or obviating the need for any separate mounting accessory, such as mounting bracket, in addition to the housing. In accordance with embodiments of the present disclosure, the number and placement of mounting holes, or other similar mounting structures, can vary.

With further reference to FIG. 1, an indicator lens device 40 is shown supported by mounting portion 26 and located between the upper mounting holes 34a-b, in accordance with various embodiments. The indicator lens 40 is typically made of a transparent and/or translucent material that allows light from one or more internal LEDs (shown in FIG. 3) to shine through the device to convey, by way of example, a power or output status signal. In accordance with embodiments of the invention, the indicator lens device 40 can be a separate component that is then secured or otherwise attached to the housing by various methods, including by way of example, gluing, or ultrasonic welding. In alternative embodiments, the indicator lens device 40 can be molded (e.g., over-molded, insert molded, etc.), or otherwise provided as part of the housing 12. The indicator lens device 40 can comprise one or more optical structures, features, contours, shapes, surfaces and the like in order to enhance the visibility of the light, and these can include one or more of the following: lens curvature(s), light pipe(s), prism(s) and/or polished/textured surfaces.

In accordance with at least some embodiments, the housing 12 includes a pair of support gussets 42a-b which, as shown, are generally formed in, or otherwise integrated with respect to at least one of the bottom 23, left side 20 and/or right side 22. Each of the support gussets 42a-b provides additional strength to the housing 12, particularly if the housing is mounted by way of, or otherwise using, the second (or lower) mounting holes 36a-b. Finally, an exemplary connector 44 (e.g., cable/pigtail connector) extends from a grommet or grommet structure 46, also shown in exemplary fashion. As is known, the grommet can provide strain relief and it can further serve to seal the internal potting compound (contained in housing) and against its discharge through the bottom 23 of housing 12.

Figure 13:
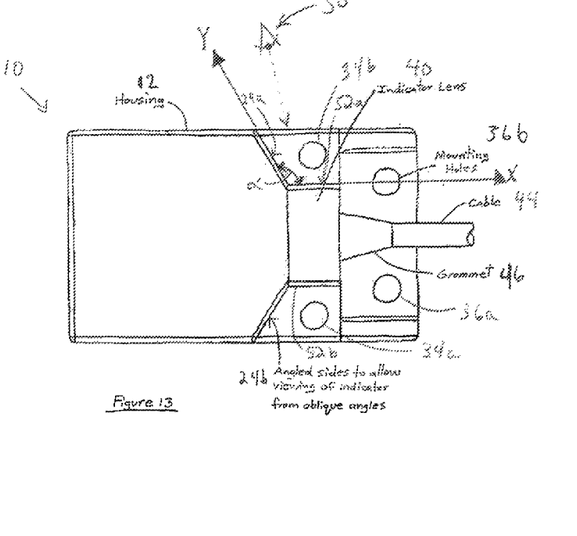
FIG. 13 is a top view of the sensing assembly of FIG. 1.

Referring additionally to FIG. 13, a top view of the sensing assembly 10 of FIG. 1 is shown. Again, the assembly 10 is shown to include a housing 12, first and second mounting holes 34a-b and 36a-b, respectively, a connector 44 and grommet structure 46 extending from the housing 12 between the second mounting holes 36a-b. The sensing assembly further includes an indicator lens device 40 positioned between the first mounting holes 34a-b.

Advantageously, housing includes the sides or faces 24a-b positioned near and in relation to the indicator lens device 40. The sides or faces 24a-b can be angled, shaped, or otherwise oriented, to allow for enhanced and generally increased visibility of the light shining through the indicator lens device 40. More particularly, as will be described herein, the indicator lens device is or can be viewed (e.g., by a human viewer, or a machine viewer, such as a robot) throughout (or at least substantially throughout) an oblique, viewing angle range which, in accordance with embodiments of the present disclosure and as shown, includes an angle greater than 90 degrees (i.e., an obtuse angle). More specifically, with reference to FIG. 13, the viewer (again human or machine) is schematically indicated with reference numeral 50 as viewing the indicator lens device 40 from a vantage point beside the indicator lens device. Side or face 24a is shown to include an axis Y. Stated another way, axis Y at least partially coincides with at least a portion of side or face 24. Indicator lens device 40 includes surfaces 52a-b (left and right side faces or surfaces). As shown, surface or face 52a includes an axis X. Stated another way, axis X at least partially coincides with at least a portion of surface 52a. As shown, axis Y intersects axis X to create an oblique viewing angle range α as shown. In at least some embodiments, as shown, the range is greater than 90 degrees, for example, a range of 120 degrees, and so the range can be referred to as an obtuse viewing angle range. Advantageously, and in accordance with embodiments of the invention, at least a portion of the indicator lens device is visible or viewable to a viewer throughout (or at least substantially throughout) the oblique (as shown, obtuse) viewing angle range, and therefore the oblique viewing angle range includes each and every angle (e.g., 30 degrees, 60, degrees, 90 degrees, 120 degrees, 150 degrees) within and throughout the range. In at least some embodiments, the oblique viewing angle range includes only a range of angles making up or within an obtuse viewing angle.

It should be understood that, in accordance with at least some embodiments, surface 52a of indicator lens device 40 can be at least partially substantially planar in shape and face 24a can be at least partially substantially planar in shape. In accordance with other embodiments, surface 52a can be at least substantially entirely planar in shape and face 24a can be at least substantially entirely planar in shape. Thus, axis Y can coincide with a plane (or portion of a plane) and axis X can coincide with a plane (or portion of plane) and the respective planes can intersect to create another oblique viewing angle range between the respective planes. And again, in accordance with at least some embodiments, the angle range is greater than 90 degrees, thereby providing an obtuse viewing angle range. It should be further understood that the viewing angle range can be determined using other conventions. For example, the viewing angle range may be characterized by a range of angles that is supplementary to the obtuse angle range referenced previously (e.g., a 60 degree viewing angle range, which is supplementary to a 120 degree viewing angle range). In such instances, one of skill in the art will appreciate that such an oblique viewing angle range can be less than 90 degrees, while still providing the desired enhanced visibility of the indicator lens device.

Still other conventions and/or coordinate systems (e.g., spherical coordinates) can be used without departing from the spirit and scope of the invention. The geometries of the side or face portion 24a and the indicator lens device 40, respectively (as with the geometry of the housing 12 and its various portions), can vary to convenience while providing or otherwise maintaining enhanced and/or increased viewing throughout, or at substantially through an oblique viewing angle range by a viewer consistent with the teachings of the disclosure herein.

One of skill would understand that this is for simplicity and that the principles and teachings are applicable to the side or face portion 24b and indicator lens device surface 52b. As shown, and in accordance with at least some embodiments, sensing assembly housing 12 is generally symmetrical about an axis Z, which coincides at least in part with connector 44, although this is not required. And so another oblique viewing angle range is formed in similar fashion as oblique viewing angle range α, using at least a portion of the indicator lens device surface 52b and at least a portion of the side or face 24b. Stated another way, in accordance with at least some embodiments of the present disclosure, at least another portion of the housing can coincides at least in part with an additional (e.g., a third) and at least a portion of the indicator lens can coincides with still another (e.g., fourth) axis; and these respective additional axes can intersect to form an additional oblique viewing angle range and at least a portion of the indicator lens device is or can remain visible at least substantially throughout the additional oblique viewing angle range. It shall be understood that such other oblique viewing angle range can, in at least some embodiments, be a distinct and different viewing angle range (e.g., larger or smaller) than the viewing angle range α as shown. As before, the oblique viewing angle range includes each and every angle (e.g., 30 degrees, 60, degrees, 90 degrees, 120 degrees, 150 degrees) within and throughout the range. In at least some embodiments, the oblique viewing angle range includes only a range of angles making up or within an obtuse viewing angle.

Other geometries, shapes, sizes, and orientations of the sensing assembly 10, including the housing 12 and indicator lens device 40, and portions thereof, which provide for other oblique viewing angle ranges, including both obtuse and acute viewing angle ranges, are contemplated considered within the scope of the present disclosure. In accordance with at least some embodiments of the present disclosure, a sensing device is provided having a pair of oblique viewing angle ranges, each formed by at least a respective portion of an indicator lens device (or a plurality of such devices) and a portion or portions of a sensing device housing. In at least some such embodiments, the indicator lens is viewable through the respective oblique viewing angle ranges from more than one side of the sensing device, including opposite sides of the sensing device.

Referring to FIG. 2, another exemplary sensing assembly 60 (e.g., a proximity sensor) is shown in accordance with additional embodiments and with some additional detail. The sensing assembly 60 generally comprises a housing 62 having a similar geometry as that described previously with respect to FIGS. 1 and 13, and so the detail already provided regarding the housing geometry, including the respective portions of the housing, applies, or at least substantially applies, to the instant embodiment. The housing 62 again generally includes a top 64, front 66, rear 68, left 70, right 72, and bottom 73 sides. Connector 74 is illustrated and it is noted that instead of a cable/pigtail connector (as shown in FIGS. 1 and 13), the connector 74 comprises a fixed, threaded connector or connecting device. The connector 74 is of a style that is generally accepted by the industry (e.g., pico, micro, mini etc.) and is shown to include pins or pin mechanisms 75 capable of engaging another component (not shown) for use in connection with the sensing assembly 60. In the present embodiment, the threaded connector 74 is shown to be an integral part of the housing 62, and it extends from the bottom side or surface 73 of the sensor housing. In other embodiments, that threaded connector 74 can be a separate component that is capable of engaging, or otherwise capable of being integrated with respect to, the housing 62. For example, the connector can be machined or molded separately and later press fit into a receptacle or other opening in the housing that can be used to receive the connector. And, if desired, the threaded connector can be oriented, or otherwise positioned, to extend from another side, or surface, of the housing 62. An indicator lens device 76 is again shown and positioned in relation to (e.g., connected and adjacent) the housing 62 in a similar fashion as described with respect to FIGS. 1 and 13.

In accordance with various aspects of the present disclosure, a number of arrows are shown as radiating or otherwise extending from the indicator lens device 76 and these arrows illustrate the wide range of viewing angles from which light emitted from the indicator lens device 76 can be viewed or detected. Arrow 77 is a representative a viewing angle indicative of a viewing perspective that directly faces, or at least generally directly faces, the front side 66 of the housing 62. Arrow 77, in the present embodiment, is shown to be normal to, or substantially normal to, a front portion of the indicator lens device 76. Arrows 78 and 79 are representative viewing angles indicative of viewing perspectives that directly face, or at least generally directly face, either the left side 70 (arrow 78) or the right side 72 (arrow 79) of the housing 62. In the present embodiment, arrows 78 and 79 are shown to be normal to, or at least generally normal to, side surfaces or portions (e.g., left and right side surfaces or portions) of the indicator lens device 76. Arrow 80 is representative of a viewing angle indicative of a viewing perspective that directly faces, or at least substantially directly faces the bottom side 73. In the present embodiment, arrow 80 is shown normal to, or at least generally normal to a bottom portion of the indicator lens device 76. Arrow 81 is representative of a viewing angle indicative of a viewing perspective that faces, or at least substantially faces, both the front and the bottom sides (commonly referred to as a perspective view). In the present embodiment, arrow 81 is shown normal to, or at least generally normal to, a curved portion of the indicator lens device 76.

With further reference to FIG. 2, arrows 82 and 83 are representative of additional viewing angles indicative of additional viewing perspectives in accordance with embodiments of the present disclosure. The viewing perspectives indicated by arrows 82 and 83 face, or at least generally face, the left side 70 (arrow 82) and/or the right side 72 (arrow 83), respectively of the housing 62 (as well as the left and right sides or side portions of the indicator lens assembly). As shown, the viewing perspectives indicated by arrows 82 and 83 can be further characterized as being beyond the respective left and right top most edges 84 and 85 (hidden), respectively, of the indicator lens device (i.e., as shown, in a position towards the top side 64 of the housing 62). Stated another way, the viewing perspectives 82 and 83 are permitted by, and (as shown) generally aligned with or otherwise corresponding to, side portions 86a-b, which in the present embodiment are again angled towards the housing top side 64. The representative viewing angle range can be termed an oblique viewing angle range and at least a portion of the indicator lens device can be viewed from the indicated positions throughout or substantially throughout the oblique viewing angle range. In accordance with at least some embodiments of the present disclosure, the oblique viewing angle range can be considered to be an obtuse (or acute) viewing angle range as described previously.

As described above, the sensing face of the sensing assembly 60 can be configured in up to four different positions (corresponding to the top, front, left or right sides, respectively) at the factory, it is necessary to indicate to the end-user which surface is the sensing face. This can be done through a variety of methods, such as: incorporating a feature as part of a removable insert in a tool (e.g., a molded in feature in an injection molding tool). Alternatively, pad printing, a label, or laser marking, can be used, each of these identified by way of example and not limitation. The indication is identified by numeral 88.

Figure 3:
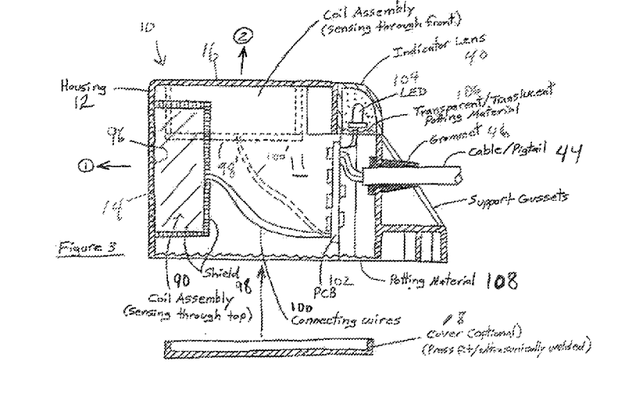
FIG. 3 is a schematic cross-sectional view of the sensing assembly of FIG. 1 illustrating exemplary internal componentry.

Referring to FIG. 3, a cross-sectional view of the sensing assembly 10 of FIG. 1 is shown, illustrating various components (or "componentry") positioned within an interior 11, or internal to, the housing 12. The sensing device 10 comprises a coil assembly, generally referred to by numeral 90. The coil assembly 90 may, in at least some embodiments, comprise (although not shown) a ferrite core and a copper wire wound bobbin, or a copper wire wound bobbin alone, or planar coil consisting of one or more printed circuit boards or "PCB's" with spiral traces. The coil assembly 90 is schematically shown and is attached to the internal surface 96 of the sensing face, which corresponds to top side 14. A shield structure 98, typically constructed of copper or brass, may encapsulate or otherwise surround the coil assembly 90 along the sides of the sensing face (again shown as top side 14), and/or another side (e.g., the rear or the back side) to facilitate some sensing modes, such as a "shielded sensing mode", or to otherwise improve performance. Wires, generally referred to by numeral 100, are shown to connect the coil assembly 90 to a PCB 102 containing sensing circuitry. An light-emitting diode 104, or "LED" (e.g., typically leaded or surface mount) is soldered or otherwise connected to the PCB 102 and located in proximity of the indicator lens device 40 to allow light from the LED to radiate outwards through the indicator lens device. The inside of the indicator lens device 40 may be filled with a transparent and/or translucent potting compound 106 (shown with dots) to help couple the light radiating from the LED with the optical structures and/or surfaces of the indicator lens device. The cable/pigtail connector 44, or fixed threaded connector with pins (FIG. 2) is soldered or otherwise connected to the PCB, for example via grommet 46, to provide power to the sensor. Support gusset structures 42a-b are also shown.

The housing 12 is shown to be generally enclosed on all sides except the rear or back side 18, which is shown to be separated from the housing 12 so that the housing is open. The coil assembly 90 and electronics already described are inserted into the housing 12 through this open side or opening. FIG. 3 illustrates the sensing assembly 10 having two different sensing face positions, corresponding to top (1) and front (2), illustrating advantageous variability associated with the present embodiment(s). More specifically, the above description relating to the shield structure 98, encapsulated coil assembly 90 and associated electronics corresponds to the top (1) sensing face position, that is, with the sensing face corresponding to top side 14. With the latter position (2), in which the sensing face corresponds to the front side 16, the shield structure 98' and connecting wires 100' are shown in dashed lines. Other sides of the housing 12 can be used to correspond to alternative sensing face positions in similar fashion. Once assembled, the entire housing cavity or interior 11 may be filled with a potting material 108, typically up to (so as to cover) the back or rear surface 18 to encapsulate all of the components positioned in the interior and provide additional durability. Back or rear side 18 (also more generally referred to as a "sensing assembly housing structure") may be assembled to the housing 12 via any of a number of conventional assembly approaches, including but not limited to: a) press fit; b) gluing; or c) ultrasonic welding and, once so assembled, is made part of the housing 12.

Figure 4:
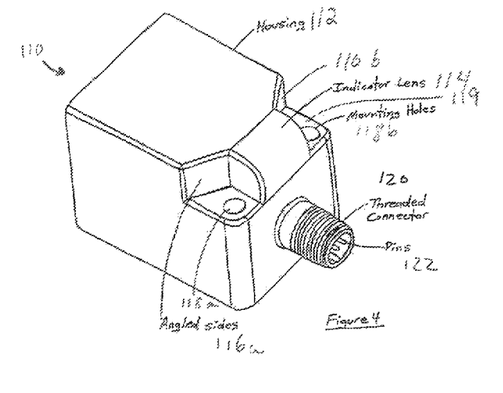
FIG. 4 is a perspective of a sensing assembly in accordance with at least one other exemplary embodiment of the present disclosure.

Referring to FIG. 4, a sensing assembly 110 (e.g., a proximity sensor) is shown in accordance with alternative embodiments of the present disclosure. As shown, the assembly 110 includes a housing 112 and indicator lens device 114 that provides an enclosure for sensing device components and bears similarities to the housing 12 (FIG. 1). For instance the housing 112 includes sides or faces 116a-b which provide for an oblique, typically obtuse, viewing angle for a viewer observing the indicator lens device 114, again which is shown positioned between a pair of mounting holes 118a-b located on a mounting portion 119. However, and in contrast to the embodiments of FIG. 1, housing 112 includes only a single pair of mounting holes 118a-b. A fixed threaded connector 120 having pin connectors 122 of the kind described with respect to FIG. 2 is shown, although it will be appreciated that the sensing assembly 110 can alternatively include a cable and/or pigtail-type connector of the kind described with respect to and illustrated in FIG. 1, or another connector or connecting device. The threaded connector can be integrally formed, or otherwise integrated with respect to, the housing 112. Additionally, and again by way of example, support gusset structures 42a-b (FIG. 1) are not present. Absence of such structures can provide, among other things, the capability of accommodating another or larger connector by providing more receiving space for the connector.

Figure 5:
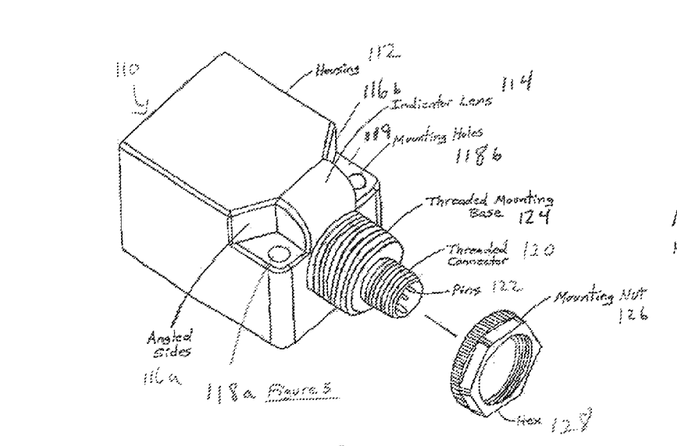
FIG. 5 is a perspective of a sensing assembly in accordance with at least one other exemplary embodiment of the present disclosure.

Referring to FIG. 5, and in another embodiment, the sensing device 110 of FIG. 4 (e.g., a proximity sensor) is shown, again including the housing 112 having the various sides or surfaces, including angled sides 116a-b. The indicator lens device 114 is again shown positioned on mounting portion 119 adjacent the sides 116a-b and between mounting holes 118a-b. The device again includes threaded connector 120 having pin connectors 122. Also shown is an additional threaded mounting base 124 that is used to connect to or otherwise engage devices such as a threaded mounting nut 126, screws (not shown) or other mechanisms or devices. In this way, the additional mounting base 124 can facilitate additional flexibility of installation with or with respect to additional devices. The threaded mounting base 124 can be of or include any thread size commonly used in the industry, for example, such as 18 mm threads. In one embodiment and as shown, the mounting nut mechanism 126 includes a "hex" or hexagonal engagement face 128. It is noted too that the thread diameter of the threaded mounting base 124 can also be sized to correspond to the mounting diameter of many of the existing cube and/or rectangular sensing device (e.g., proximity sensor) mounting brackets currently on the market, which are 22 mm. This allows for "reverse" or backwards compatibility. The threaded mounting base 124 can be integrally formed, or otherwise integrated with respect to, the housing 112.

Figure 6:
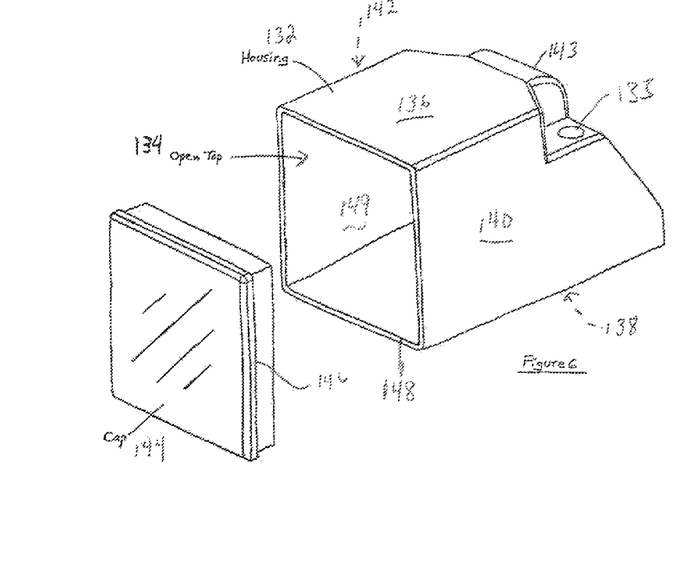
FIG. 6 is a perspective of a sensing assembly housing in accordance with at least one exemplary embodiment of the present disclosure.

With reference now to FIG. 6, and in accordance with at least some other embodiments, an exemplary sensing device housing 132 is shown having a similar geometry and having similar structural features, such as mounting holes 133 (one hidden), as the sensing device housing 12 of FIG. 1. As shown, however, the housing 132 includes an open top 134, as well as a front side 136, a rear side 138 (hidden), a right side 140 and left side 142 (hidden). An indicator lens device 143 is also shown. The open top 134 is generally sized and shaped to receive a cap or cap structure 144 (also referred to, more generally, as a sensing assembly housing structure) that serves as a sensing face (as described above) and which is subsequently capable of being received, so as to be assembled to and made a part of, the housing 132. More specifically, the cap 144 can include a ridge 146 that can mate with edge 148 surrounding opening or open top 134 so as to encapsulate or otherwise enclose the interior 149. The cap 144 can be made out of plastic, but alternatively and in accordance with at least some preferred embodiments, the cap 144 can be made of metal, such as stainless steel or titanium. It is noted that a metal sensing face offers additional durability and ruggedness. Similarly, and in accordance with various embodiments, including at least some of the embodiments disclosed herein, the housing 132 can be made out of plastic or metal.

Figure 7:
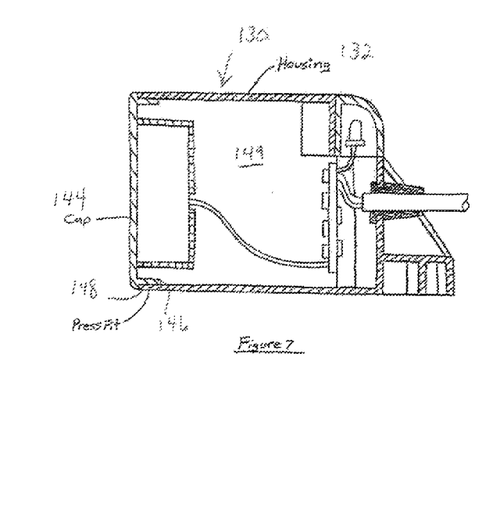
FIG. 7 is a schematic cross-sectional view of the sensing assembly housing of FIG. 6 illustrating exemplary internal componentry.

FIG. 7 shows a cross-sectional view of the sensing device housing 132 of FIG. 6. The housing 132 of the sensing device 130 encloses an interior 149 as previously described. And the interior is used to hold or otherwise contain internal components of the sensing assembly 130 which are shown and which are similar, or identical, to those components illustrated and/or described with reference to FIG. 3. Advantageously, and in accordance with various embodiments of the present disclosure, the cap structure 144 is shown in a final position with respect to the housing 132. That is, the cap structure 144 is shown assembled to the housing 132 such that the ridge or ridge structure 146 is adjacent, contacting, and/or joined to housing 132 using, for example and as shown, including edge 148. It is to be understood that such assembly of the cap structure 144 to the housing can be by a variety of methods, including by way of example and not limitation, press fitting, ultrasonic welding, and the like, with such assembly creating a secured housing 132 for holding and/or containing the internal components.

Figure 8:
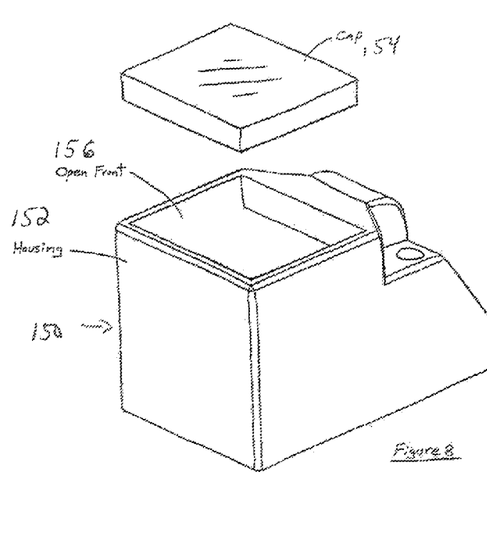
FIG. 8 is a perspective of a sensing assembly housing in accordance with at least one other exemplary embodiment of the present disclosure.

FIG. 8 illustrates another alternative, exemplary, embodiment of the sensing device housing which is similar to that of FIGS. 6-7. However, a discrete or separate cap structure 154 is used to enclose an open front side 156 formed in the housing 152. The cap or cap structure 154 can be assembled to the open front 156 so that it is made a part of the housing 152 as shown, for example, via a press-fit or other method. Here again, the cap 154 can be made out of plastic, or metal, such as stainless steel or titanium. Similarly, the housing 152 can be made out of plastic or metal. The precise geometry, location, size, shape and number of the cap structures can vary from those shown and/or described herein (e.g., FIGS. 6, 7 and 8) and such other embodiments are contemplated and considered within the scope of the present disclosure.

Figure 9:
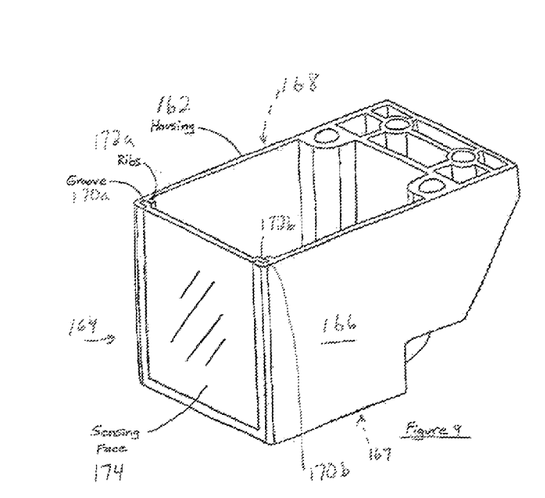
FIG. 9 is a perspective of a sensing assembly housing in accordance with at least one other exemplary embodiment of the present disclosure.

FIG. 9 shows a sensing device housing 162 in accordance with other embodiments of the present disclosure. The overall geometry of the housing 162 is generally similar to previous embodiments, and includes an open top 164, as well as side walls 166 and 168 (hidden). Grooves or groove structures 170a-b and ribs or rib structures 172a-b in the side walls 166 and 168 of the housing accept or otherwise receive a sensing face 174 in a tongue and groove style. The sensing face 174 slides in (as shown, down or downwardly) the grooves 170a-b and produces an interference that keeps the sensing face in place and so that it is made a part of the housing 162. The sensing face 174 can be made out of plastic, but in at least some preferred embodiments, can be made of metal, such as stainless steel or titanium. Again, a metal sensing face can offer additional durability and ruggedness. Similarly, the housing 162 can be made out of plastic or metal. It should be understood that the groove and rib structures described above can be similarly used to place or otherwise accommodate the sensing face along, or in other sides of, the housing 162, such as the sides 166 or 168, or the front side 167 (hidden) of the housing. And in each instance, once assembled, sensing face is a part of the housing.

Figure 10:
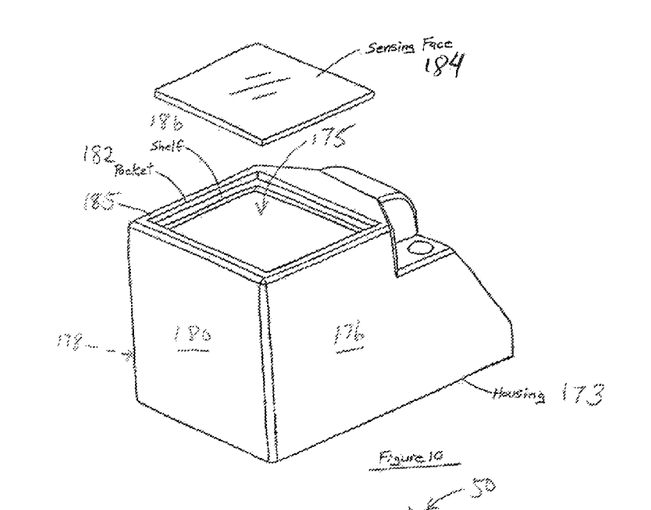
FIG. 10 is a perspective of a sensing assembly housing in accordance with at least one other exemplary embodiment of the present disclosure.

Referring to FIG. 10, a perspective view of another housing 173 for a sensing assembly (e.g., a proximity sensor) is shown in accordance with embodiments of the invention. Here again, the overall shape or geometry of the device housing 173 is generally similar to previous embodiments, and includes an open front or front side 175, side walls 176 and 178 (hidden), and a top 180. The housing 173 includes a pocket structure 182 to receive or accept a sensing face structure 184 (also more generally referred to as a sensing assembly housing structure). The pocket structure 182 includes a shelf structure 186 formed therein and for seating sensing face structure 184. The sensing face structure 184 can be assembled to, or otherwise engage, so as to be made a part of, the housing 173 in any of a variety of ways, for example, by gluing the sensing face to the shelf. When assembled, the sensing face 184 sits flush to edge or surface 185 so to sit flush with respect to the exterior of the sensing device housing 173 and the housing, at least in this way, includes the sensing face structure 184.

In accordance with the present and other embodiments disclosed herein, it is again noted that the sensing face structure (e.g., structure 184) can be made of a plastic or metal, such as stainless steel or titanium. Similarly, the housing structure (e.g., housing 173) can also be made of either plastic or metal. Therefore, it is possible to have a metal sensing face and plastic housing, or plastic sensing face and metal housing.

Figure 11:
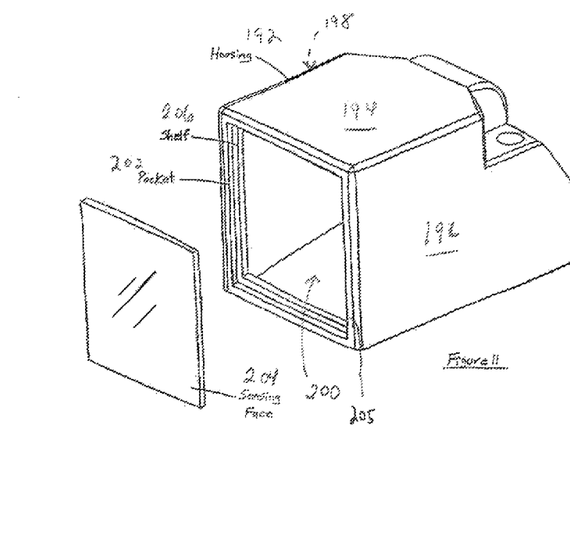
FIG. 11 is a perspective of a sensing assembly housing in accordance with at least one other exemplary embodiment of the present disclosure.

With reference to FIG. 11, a perspective view of another a sensing device housing 192 for a sensing device, such as a proximity sensor is shown in accordance with embodiments of the invention. Here again, the overall shape or geometry of the device 192 is generally similar to previous embodiments, and includes a front or front side 194, side walls 196 and 198 (hidden), and an open top 200. The housing 192 includes a pocket structure 202 to receive or accept a sensing face structure 204. As with respect to FIG. 10, the pocket structure 202 includes a shelf structure 206 formed therein and for seating sensing face structure 204. The sensing face structure 204 can be assembled to, or otherwise engage, so as to be made a part of, the housing 192 in any of a variety of ways, for example, by gluing the sensing face to the shelf. When assembled, the sensing face 204 sits flush to edge or surface 205 so to sit flush with respect to the exterior of the sensing device housing 192 and the housing, at least in this way, includes the sensing face structure. The precise geometry, size, location, shape and number of the sensing face structures can vary from those shown and/or described herein (e.g., FIGS. 10 and 11) and such other embodiments are contemplated and considered within the scope of the present disclosure.

While not shown, it should also be understood that the approach of including or incorporating a pocket structure, as described with reference to FIGS. 10 and 11, can be applied to the sides of the sensing device housing as well. In this way, the sensing face structure can be incorporated into the sides of the sensing device.

Figure 12:
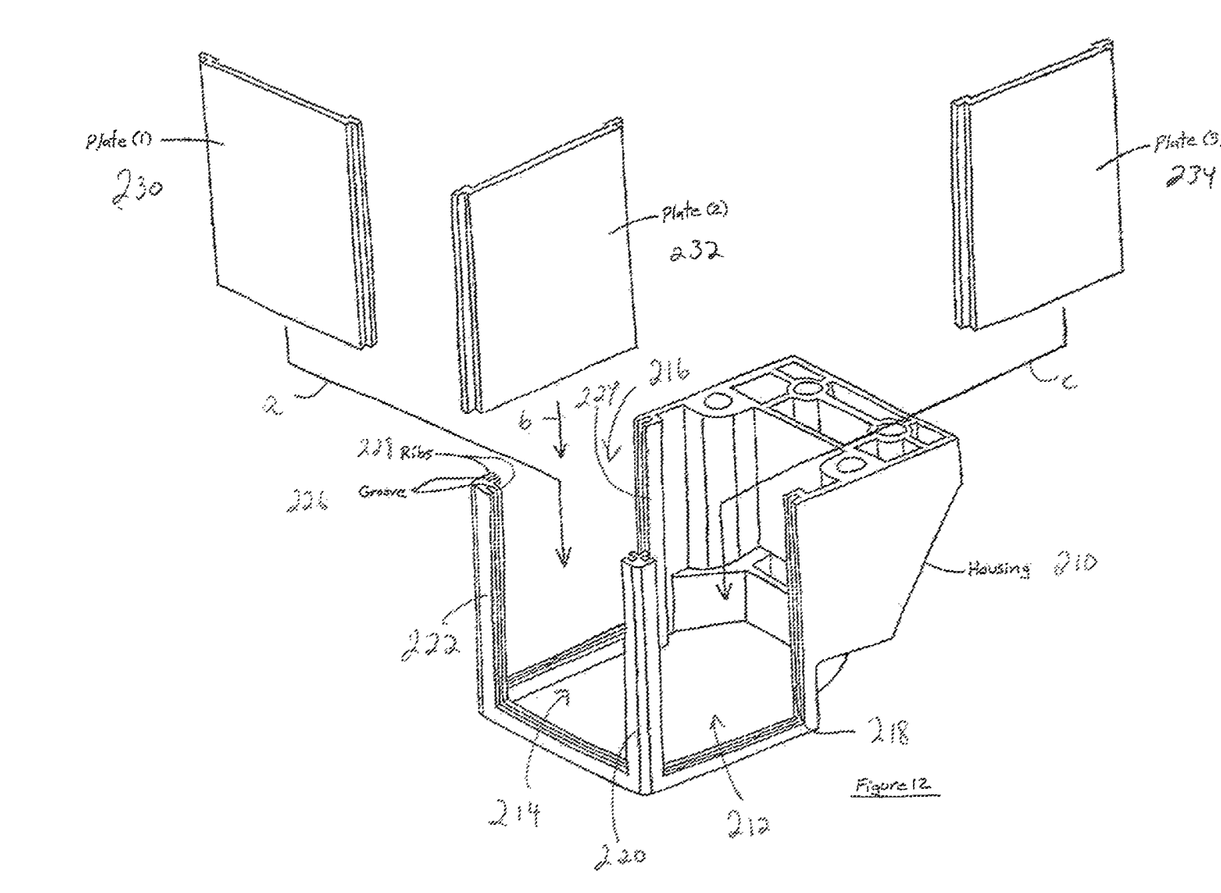
FIG. 12 is a perspective of a sensing assembly housing in accordance with at least one other exemplary embodiment of the present disclosure.

Referring to FIG. 12, a sensing device housing 210 for a sensing device (e.g., a proximity sensor) is shown. It should be understood that the sensing assembly housing 210 is similar to the sensing device housings described previously, for example, the housing 162 described with respect to FIG. 9. Thus, certain details which were already provided regarding the overall the housing geometry, including respective housing sides or portions (e.g., top, front, rear, left and right sides or portions) of the housing apply in the instant embodiment and are not described further here. Sensing device housing 210 includes a plurality of openings 212, 214, and 216 as shown. Each of the openings are bounded by housing portions 218, 220, 222 and 224, respectively, each of which include groove structures 226 and rib structures 228. For simplicity, groove and rib structures 226 and 228 are identified with respect to housing portion 222 (which as shown includes a pair of each of the respective structures). The respective groove and rib structures 226 and 228 are formed or otherwise provided as part of the respective housing portions 218, 220, 222, and 224 and are used to accept, as shown, a respectively plate structure. As shown, the housing 210 can receive up to three plate structures, 230, 232 and 234 (or "plates" or, more generally, "sensing assembly housing structure") corresponding to the top (1) and sides (2) and (3) and, once assembled, housing, includes these respective plate structures.

In order to accomplish assembly, the plates 230, 232 and 234 slide in a direction (indicated by arrows a, b, and c, respectively) and in the grooves and produce an interference or interference fit that keeps the plates in place. When assembled, the plates sit flush to the exterior of the proximity sensor housing in a fashion similar to that previously described with respect to the FIG. 10 and the overall shape or geometry of the housing is generally similar to at least some of the previous embodiments. Typically, one of the plates 230, 232 or 234 is used or serves as the sensing face, with the selection or selecting of which plate(s) is used depending on one or more factors, such as the intended use of the sensing assembly. In at least some aspects, the plates 230, 232 or 234 can be made of a plastic or metal, such as stainless steel or titanium. Different combinations of plastic and/or metal plates can be used, such as one metal plate and two plastic plates. Similarly, the housing can also be made of either plastic or metal. Therefore, it is possible to have a metal sensing face and plastic housing, or plastic sensing face and metal housing. The precise geometry, size, location, shape and number of plate structures can vary from those shown and/or described herein and such other embodiments are contemplated and considered within the scope of the present disclosure.

In yet another embodiment (not shown), the embodiment shown in FIG. 12 and the embodiment shown in FIG. 10 can be combined. That is, the sensing device housing can be provided with to include the plate structures (including, by way of example, the exemplary groove and rib structures) and the pocket structure (including, by way of example, the shelf structure). In this way, maximum flexibility of sensing face combinations can be provided by permitting sensing face (of which there is typically one in a sensing assembly as previously described) to be selected by a user from any of the top, front, and sides of the housing.

In accordance with other aspects and embodiments, the entire, or substantially the entire, housing of the sensing device can be made of a transparent, or translucent, material. In such embodiments, the entire, or substantially the entire, housing will become illuminated when lit with one or more LED's. Advantageously, in at least some such embodiments, a wide range of viewing angles or ranges of viewing angles can be provided, including one or more oblique viewing angle ranges.

The sensing device and its components can be constructed of a variety of materials, including plastic, metal, or a combination of plastic and metal. The present disclosure provides for a sensing assembly that affords significant flexibility in material selection based on various needs and criteria. For example, in a welding environment, in which there might be molten slag, it may be desirable to construct at least a portion of the sensing assembly from a metal (e.g., stainless steel), as opposed to an expensive plastic material.

With particular reference to the exemplary proximity sensor shown in FIG. 9, and in accordance with at least some aspects and embodiments of the present disclosure, the sensing face is made of a plastic material and the housing is made of a metal such as stainless steel. In this configuration, the plastic sensing face will allow the electromagnetic field generated by the coil assembly to penetrate further through the sensing face, resulting in a longer sensing distance. Furthermore, the metal housing offers added durability to the sensor.

With particular reference again to the exemplary proximity sensor shown in FIG. 9, and in accordance with at least some aspects and embodiments of the present disclosure, the sensing face is made of a metallic material, such as titanium, and the housing is made of another metallic material, such as stainless steel. In this configuration, the titanium sensing face will allow the electromagnetic field generated by the coil assembly to penetrate further through the sensing face, resulting in a longer sensing distance. Furthermore, the titanium sensing face and stainless steel housing offer enhanced durability to the sensor over one with a plastic sensing face. Stainless steel can also be used as a material for the sensing face instead of titanium. However, due to differences in the magnetic permeability of the materials, the stainless steel sensing face would have to be much thinner (and therefore less robust) in order to achieve a longer sensing distance. With titanium, a greater sensing distance can be achieved with a thicker piece of material, which results in greater robustness.

The use of titanium as a sensing face material is described in US patent application 20110101967, entitled "Enhanced Performance Proximity Sensor", which is hereby incorporated by reference in its entirety herein. Still other materials, such as aluminum, nickel-plated brass, or zinc may also be used to construct the housing.

Manufacturing cost savings can be realized by standardizing on, or utilizing, one housing material and then utilizing one or more inexpensive sensing faces (e.g., plates or faces that are configured to slide in or otherwise be positioned with respect to the housing material) made of one or more distinct and different plastic or metallic material or materials, to achieve the desired performance. This approach also provides flexibility in configuring the sensor to meet the needs of the end user.

With particular reference to the exemplary proximity sensor shown in FIG. 12, and in accordance with at least some aspects and embodiments of the present disclosure, the housing is made of plastic and the three plates are made of a nickel plated brass or copper or mu-metal in order to provide some measure of shielding of the electromagnetic field generated by the coil assembly.

With particular reference to the exemplary proximity sensor shown in FIG. 12, and in accordance with at least some aspects and embodiments of the present disclosure, one or more of the three plates are made of a translucent plastic such that the panels themselves serve to provide a means of conveying a status signal, such as power or output, which is visible to the end user.

In accordance with at least one aspect of the present disclosure, a sensing assembly is disclosed. The sensing assembly comprises: a sensing assembly housing, the housing for enclosing an interior; a plurality of sensing assembly components at least partially positioned or at least partially contained within the interior; and an indicator lens device which is integral with, or integrated with respect to the housing. At least a portion of the housing coincides at least in part with a first axis and at least a portion of the indicator lens coincides with a second axis. The first axis and the second axis intersect to form an oblique viewing angle range and at least a portion of the indicator lens device is visible at least substantially throughout the oblique viewing angle range. In at least some embodiments, the oblique viewing angle range is an obtuse viewing angle range.

In accordance another aspect of the present disclosure, a sensing assembly housing is disclosed that is for use with a sensing assembly having an indicator lens device. The sensing assembly housing comprises: a portion that coincides at least in part with a first axis, the first axis intersecting a second axis that coincides at least in part with at least a portion of the indicator lens device to form an oblique viewing angle range. At least a portion of the indicator lens device remains visible at least substantially throughout the oblique viewing angle range. In at least some embodiments, the oblique viewing angle range is an obtuse viewing angle range.

In accordance with another aspect of the present disclosure, a sensing assembly housing is disclosed. The sensing assembly housing comprises: a plurality of portions or sides connected, or formed, together; and at least one additional sensing assembly housing structure that is positioned with respect to the plurality of portions or sides to form or create an enclosure. In at least some embodiments, the at least one additional structure includes a sensing face structure that is capable of providing an area or a surface at which or by way of which a sensible signal is or can be detected. In at least some embodiments, at least one of the plurality portions coincides at least in part with a first axis which intersects a second axis that coincides at least in part with at least a portion of an indicator lens device to form an oblique viewing angle range and at least a portion of the indicator lens device remains visible to a viewer at least substantially throughout the oblique viewing angle range. In at least some embodiments, the oblique viewing angle range is either an obtuse viewing angle range or an acute viewing angle range.

In accordance with another aspect of the present disclosure, a method of assembling a sensing assembly housing is disclosed. The method comprises: providing a plurality of portions or sides connected or formed together; and positioning at least one additional sensing assembly housing structure with respect to the plurality of portions or sides to at least substantially form or create an enclosure for receiving and/or containing sensing assembly components. In at least some embodiments, the providing includes providing a plurality of portions or sides that include at least one open side and the positioning includes positioning the additional sensing assembly housing structure within or with respect to the open side so as to assemble or otherwise form the housing. In at least some embodiments, at least one of the plurality portions coincides at least in part with a first axis which intersects a second axis that coincides at least in part with at least a portion of an indicator lens device that is positioned in relation to the plurality of portions to form an oblique viewing angle range, and at least a portion of the indicator lens device remains visible to a viewer at least substantially throughout the oblique viewing angle range. In at least some embodiments, the viewing angle is an obtuse angle.

In accordance with another aspect of the present disclosure, a method of assembling a sensing assembly is disclosed. The method comprises: providing a plurality of portions or sides connected or formed together to provide for at least one side that remains open, so as to access an interior side; positioning sensing assembly components within the interior via the at least one open side; and assembling at least one additional sensing assembly housing structure with respect to the plurality of portions or sides so as to at least substantially enclose the interior containing sensing assembly components.

It is specifically intended that the present invention not be limited to the embodiments and illustrations contained herein, which include description relating to a best mode, but include modified forms of those embodiments including portions of the embodiments and combinations of elements of different embodiments as come within the scope of the following claims.

We claim:

1. A sensing assembly comprising:
a sensing assembly housing, the housing for enclosing an interior;
a plurality of sensing assembly components at least partially positioned or at least partially contained within the interior; and
an indicator lens device which is integral with, or integrated with respect to the housing;
wherein at least a portion of the housing coincides at least in part with a first axis and at least a portion of the indicator lens coincides with a second axis; and
wherein the first axis and the second axis intersect to form an oblique viewing angle range and at least a portion of the indicator lens device is visible at least substantially throughout the oblique viewing angle range.

2. The sensing assembly of claim 1, wherein the oblique viewing angle range comprises an obtuse viewing angle.

3. The sensing assembly of claim 2, wherein the obtuse viewing angle is greater than 90 degrees.

4. The sensing assembly of claim 1, wherein the first axis coincides with a surface of the indicator lens device and the second axis coincides with at least a portion of a surface of the sensing device housing such that the oblique viewing angle is formed using at least a portion of a surface of the indicator lens device surface and at least a portion of the surface of sensing assembly housing.

5. The sensing assembly of claim 1, wherein the sensing assembly housing comprises:
a portion that coincides at least in part with a first axis, the first axis intersecting a second axis that coincides at least in part with at least a portion of the indicator lens device to form the oblique viewing angle range;
wherein at least a portion of the indicator lens device remains visible at least substantially throughout the oblique viewing angle range.

6. The sensing assembly of claim 5, wherein the oblique viewing angle range is an obtuse viewing angle range.

7. The sensing assembly of claim 6, wherein the oblique viewing angle range comprises an obtuse viewing angle that is greater than 90 degrees.

8. The sensing assembly of claim 7, wherein the housing comprises:
a plurality of portions or sides connected, or formed, together; and
at least one additional sensing assembly housing structure that is positioned with respect to the plurality of portions or sides to form or create an enclosure.

9. The sensing assembly housing of claim 8, wherein the at least one additional structure includes a sensing face structure that is capable of providing an area or a surface at which or by way of which a sensible signal is or can be detected.

10. The sensing assembly of claim 9, wherein at least one of the plurality portions coincides at least in part with a first axis which intersects a second axis that coincides at least in part with at least a portion of an indicator lens device to form the oblique viewing angle range and at least a portion of the indicator lens device remains visible to a viewer at least substantially throughout the oblique viewing angle range.

11. The sensing assembly of claim 1, wherein at least another portion of the housing coincides at least in part with a third axis and at least a portion of the indicator lens coincides with a fourth axis; and wherein the third axis and the fourth axis intersect to form an additional oblique viewing angle range and at least a portion of the indicator lens device is visible at least substantially throughout the additional oblique viewing angle range.

12. A sensing assembly housing for use with a sensing assembly having an indicator lens device, the sensing assembly housing comprising:
a plurality of portions connected together; at least one of the plurality of portions coinciding at least in part with a first axis, the first axis intersecting a second axis that coincides at least in part with at least a portion of the indicator lens device to form an oblique viewing angle range and
at least one additional sensing assembly housing structure that is positioned with respect to the plurality of portions or sides to form or create an enclosure;
wherein at least a portion of the indicator lens device remains visible at least substantially throughout the oblique viewing angle range.

13. The assembly housing of claim 12, wherein the at least one additional structure includes a sensing face structure that is configured to providing an area for detecting a sensible signal.

14. The sensing assembly of claim 12, wherein the oblique viewing angle range comprises a viewing angle that is greater than 90 degrees.

15. The sensing assembly of claim 12, wherein at least one of the plurality of portions are constructed at least in part from a first material and the at least one additional sensing assembly housing structure is constructed from a second material that is distinct and different from the first material.

16. The sensing assembly of claim 12, wherein the at least one additional sensing assembly housing structure is configured to be positioned with respect to the plurality of portions to at least substantially form the enclosure, the enclosure configured for receiving and containing sensing assembly components.

17. The sensing assembly of claim 16, wherein the plurality of portions provides at least one open side and additional sensing assembly housing structure is configured to be positioned with respect to the open side to at least one of assembly and form the housing.

18. A proximity sensor comprising:
- a sensing assembly housing, the housing for enclosing an interior and including a mounting portion for mounting the housing to a supporting structure;
- a plurality of sensing assembly components at least partially positioned or at least partially contained within the interior; and
- an indicator lens device which is integral with, or integrated with respect to, the mounting portion of the housing;
- wherein at least a portion of the housing coincides at least in part with a first axis and at least a portion of the indicator lens coincides with a second axis; and
- wherein the first axis and the second axis intersect to form an oblique viewing angle range and at least a portion of the indicator lens device is visible at least substantially throughout the oblique viewing angle range.

19. The sensor of claim 18, wherein the housing comprises:
- a plurality of portions or sides connected, or formed, together; and
- at least one additional sensing assembly housing structure that is positioned with respect to the plurality of portions or sides to form or create an enclosure; and
- wherein the at least one additional structure includes a sensing face structure that is capable of providing an area or a surface at which or by way of which a sensible signal is or can be detected;
- wherein at least one of the plurality portions coincides at least in part with a first axis which intersects a second axis that coincides at least in part with at least a portion of an indicator lens device to form the oblique viewing angle range and at least a portion of the indicator lens device remains visible to a viewer at least substantially throughout the oblique viewing angle range; and
- wherein the indicator lens is positioned between a plurality of mounting holes positioned in relation to the mounting portion and which are utilized to secure the housing to the supporting structure.

20. The sensor of claim 19, wherein (i) at least one of the plurality of portions are constructed at least in part from a first material and the at least one additional sensing assembly housing structure is constructed from a second material that is distinct and different from the first material, or (ii) the housing is at least substantially entirely made of at least one of a transparent and a translucent material.

* * * * *